United States Patent [19]

Yamashita et al.

[11] Patent Number: 5,130,863
[45] Date of Patent: Jul. 14, 1992

[54] DIGITAL SIGNAL RECORDING APPARATUS FOR RECORDING PLURAL KINDS OF DIGITAL INFORMATION SIGNALS HAVING DIFFERENT RESPECTIVE BIT RATES

[75] Inventors: Shinichi Yamashita, Yokohama; Kenichi Nagasawa, Kawasaki; Tomohiko Sasatani; Toshihiro Yagisawa, both of Yokohama, all of Japan

[73] Assignee: Canon Kabushiki Kaisha, Tokyo, Japan

[21] Appl. No.: 329,812

[22] Filed: Mar. 28, 1989

[30] Foreign Application Priority Data

Apr. 11, 1988 [JP] Japan .................. 63-90109
Apr. 11, 1988 [JP] Japan .................. 63-90110
Apr. 11, 1988 [JP] Japan .................. 63-90111
Jul. 14, 1988 [JP] Japan .................. 63-176590

[51] Int. Cl.⁵ ............................................. G11B 5/09
[52] U.S. Cl. ............................... 360/48; 369/48; 369/49; 369/32; 360/43; 360/51

[58] Field of Search .................. 358/343; 369/47–49, 369/58, 59, 32; 360/43, 48, 51, 18, 33.1, 32, 36.1, 36.2, 39, 55, 77.01

[56] References Cited

U.S. PATENT DOCUMENTS

| | | | |
|---|---|---|---|
| 4,392,162 | 6/1983 | Yamamoto | 360/38.1 X |
| 4,656,536 | 4/1987 | Furumoto | 360/48 X |
| 4,807,055 | 2/1989 | Tsunoda | 360/48 X |
| 4,858,038 | 8/1989 | Kazama | 360/51 X |
| 4,920,424 | 4/1990 | Hosaka | 358/343 X |
| 4,953,168 | 8/1990 | Odaka | 358/343 X |

*Primary Examiner*—Robert L. Richardson
*Assistant Examiner*—Muhammad N. Edun
*Attorney, Agent, or Firm*—Fitzpatrick, Cella, Harper & Scinto

[57] ABSTRACT

In a digital signal recording apparatus it is possible to input plural kinds of digital information signals having different bit rates from one another. Recording is performed for each data block which includes a predetermined amount of data which includes main data corresponding to the digital information. The ratio of the main data within the data block is switched in accordance with each kind of digital information signal.

37 Claims, 11 Drawing Sheets

| FIG. 10A | FIG. 10B |
|---|---|

DIGITAL SIGNAL RECORDING APPARATUS FOR RECORDING PLURAL KINDS OF DIGITAL INFORMATION SIGNALS HAVING DIFFERENT RESPECTIVE BIT RATES

BACKGROUND OF THE INVENTION

1. Field of the Invention

This invention relates to a data recording apparatus, and more particularly, to a data recording apparatus capable of recording plural kinds of digital information signals having different bit rates from one another.

2. Description of the Prior Art

Recently, high speed processing in digital transmission techniques has been advancing, and transmission of digital signals at bit rates not less than 100 Mbps has become possible. Various kinds of transmitters and transmission media which perform transmission at such high bit rates have also been announced. Furthermore, data recorders for recording these digital signals having high bit rates are being developed.

Data transmission at such high bit rates finds wide applications, and various kinds of transmission bit rates are also provided. Even when the main information to be transmitted is limited to the so-called high-definition television signals, various transmission bit rates can be considered depending on band compression techniques, handling of voice signals and amount of other information to be transmitted.

Heretofore, it has been common to provide data recording apparatuses each of which is exclusively used for each bit rate, when these digital signals having various transmission bit rates are recorded. Even when it is considered to utilize an identical mechanism for recording data having different bit rates, it has been necessary to separately provide clock frequencies, recording formats and the like when recording. Consequently, the apparatus itself has plural channels of signal processing units. This is not preferable because one apparatus becomes large in size especially when several kinds of digital signals are to be recorded.

Now, it can be easily imagined that plural channels of digital signals having low bit rates can be recorded using such data recorders having a high bit rate.

In conventional data recorders, however, the fact is that recording can be performed only for a predetermined number of channels and at a predetermined bit rate, not that recording of an arbitrary number of channels can be performed for several digital signals having various bit rates. Hence, the conventional data recorders can be used for only limited applications.

SUMMARY OF THE INVENTION

It is an object of the present invention to solve the problems of the prior art.

It is another object of the present invention to provide a digital signal recording apparatus capable of recording plural kinds of digital information signals having different respective bit rates using a common signal processing unit.

To achieve such an object, as an embodiment according to the present invention, there is provided a digital signal recording apparatus comprising:

(a) input means for inputting plural kinds of digital information signals having different data rates from one another;

(b) blocking means for successively forming a data block comprising a predetermined number of data, inclusive of main data corresponding to the digital information signal input by the input means;

(c) recording means for recording the data block from the blocking means on a recording medium; and (d) switching means for switching the number of the main data within the data block in accordance with the kind of digital information signal input from the input means.

It is still another object of the present invention to provide a digital signal recording apparatus capable of recording digital signals having an arbitrary number of channels using a common signal processing unit.

To achieve such an object, as another embodiment according to the present invention, there is provided a digital signal recording apparatus comprising:

(a) input means for inputting j-channel digital information signals in parallel, where j is an integer greater than 1;

(b) subdata generation means for generating subdata indicating the number j of the channels of the digital information signals input from the input means;

(c) blocking means for successively forming a data block comprising a predetermined number of data, inclusive of main data corresponding to the j-channel digital information signals and the subdata input from the input means; and (d) recording means for recording the data block from said blocking means on a recording medium.

It is still another object of the present invention to provide a digital signal recording apparatus capable of recording plural kinds of digital information signals having different bit rates from one another by a simple signal processing limit.

To achieve such an object, as still another embodiment according to the present invention, there is provided a digital signal recording apparatus comprising:

(a) input means for inputting plural kinds of digital information signals having different data rates from one another;

(b) recording means for recording the digital information signal input from the input means on a recording medium; the recording means including at least one recording head; and (c) switching means for switching a rotation frequency of the rotating heads in accordance with the kind of digital information signal input from the input means.

These and other objects and features of the present invention will become more apparent from the following detailed description of the preferred embodiments taken in connection with the accompanying drawings.

BRIEF DESCRIPTION OF THE DRAWINGS

FIG. 2 (B) is a diagram showing a recording pattern in a magnetic tape by the data recorder in FIG. 1;

DESCRIPTION OF THE PREFERRED EMBODIMENTS

Now, the embodiments of the present invention will be hereinafter explained with reference to the drawings.

Figure 1:
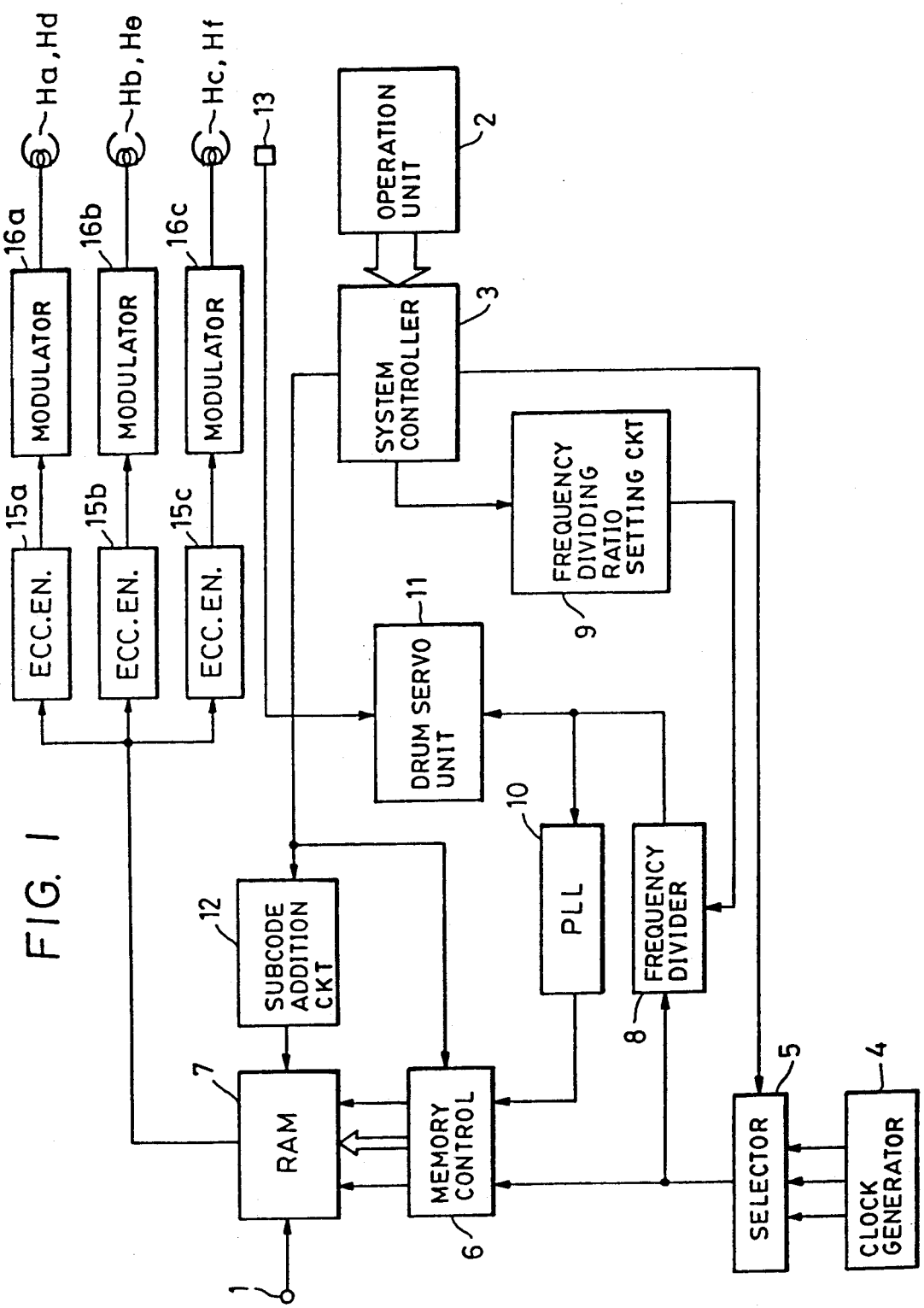
FIG. 1 is a diagram showing the configuration of a recording system of a data recorder as an embodiment of the present invention.

FIG. 1 is a block diagram showing the configuration of a recording system of a data recorder of an embodiment of the present invention. In FIG. 1, there is shown an input terminal 1 of digital signals to be recorded. In the data recorder of the present embodiment, three kinds, i.e., 139.264 Mbps, 135.168 Mbps and 120.6 Mbps, of bit rates of digital signals to be input are considered. It is possible to selectively input these digital signals having three kinds of bit rates to the input terminal 1.

An operation unit 2 is configured so that the kind of digital signal which the user intends to input to the input terminal 1 can be assigned, and supplies control data inclusive of data relative to the assignment to a system controller 3. A clock generator 4 generates three kinds of clock signals, i.e., 17.408 MHz, 16.896 MHz and 15.075 MHz when input data to the terminal 1 consist of 8 bits. A selector 5 selects, outputs and supplies to a memory control circuit 6 one clock signal among the above-described three kinds of clock signals, according to an output from the system controller 3 based on the input assignment by the operation unit 2. This output signal of the selector 5 determines a data write cycle to a RAM 7. As is well known, the memory control circuit 6 supplies a write address and a write enable signal to the RAM 7, making the output clock signal of the selector 5 a write clock signal. Thus, data indicating an input digital signal are written into the RAM 7.

Figure 2A:
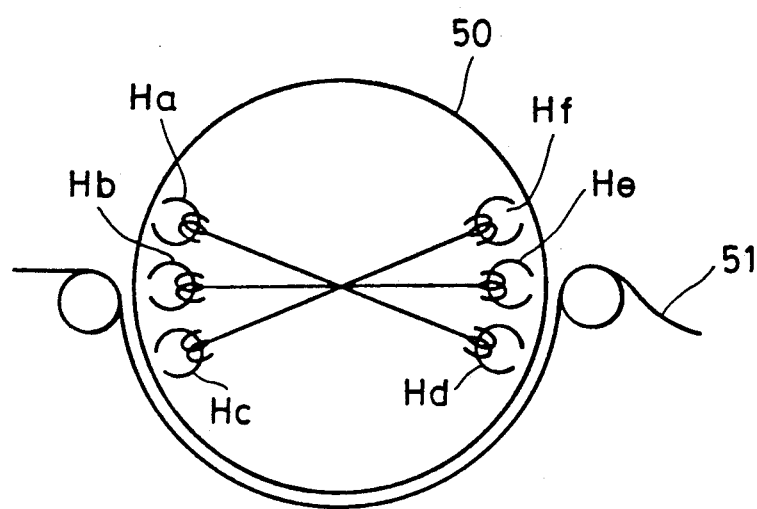
FIG. 2 (A) is a diagram showing a head configuration of the data recorder in FIG. 1.
Figure 2B:
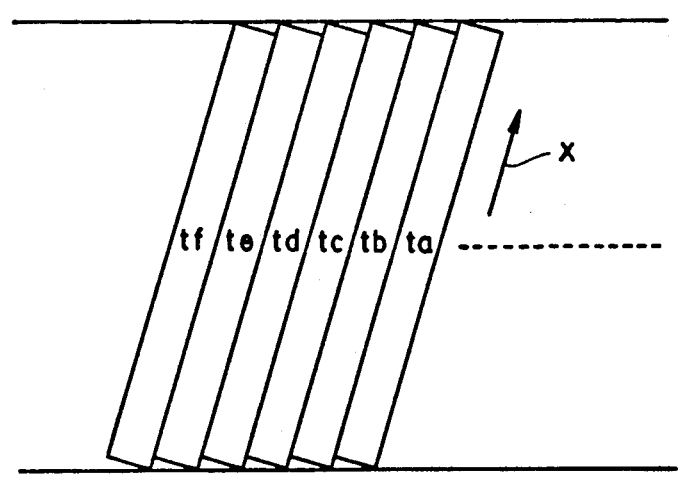

The digital data recorder (DDR) of the present invention operates, as shown in FIG. 2 (A), wherein a magnetic tape 51 is transported around a rotating drum 50 which includes three adjacently-disposed heads Ha, Hb and Hc and three adjacently-disposed heads Hd, He and Hf rotating with 180° phase difference with the former heads over a range of an angle not less than 180°, and performs recording on the magnetic tape 51 by these six heads.

The heads Ha, Hb and Hc are configured so that they are rotatably shifted by a predetermined distance in the direction of the axis of rotation from one another. The amount of the shift is set in accordance with the recording track pitch. The situation is the same for the heads Hd, He and Hf.

In FIG. 2 (B), there is shown a recording pattern on the magnetic tape, in which ta, tb, tc, td, te and tf are tracks formed by the rotating heads Ha, Hb, Hc, Hd, He and Hf, respectively, and the arrow x indicates the direction of the trace of each head.

Now, suppose that the number of rotation of the heads is 4000 r.p.m., and a digital signal of 139.264 Mbps is to be recorded. The amount of recording data necessary per one track is represented by $$139.264 \times 10^6 \times 60 \text{ (sec)}/8 \text{ (bit)} \times 4000 \times 6 \text{ (head)} = 256 \times 170 \text{ (byte)}.$$

Hence, the requirement is that 170 data groups each consisting of 256 words can be recorded.

Figure 3:
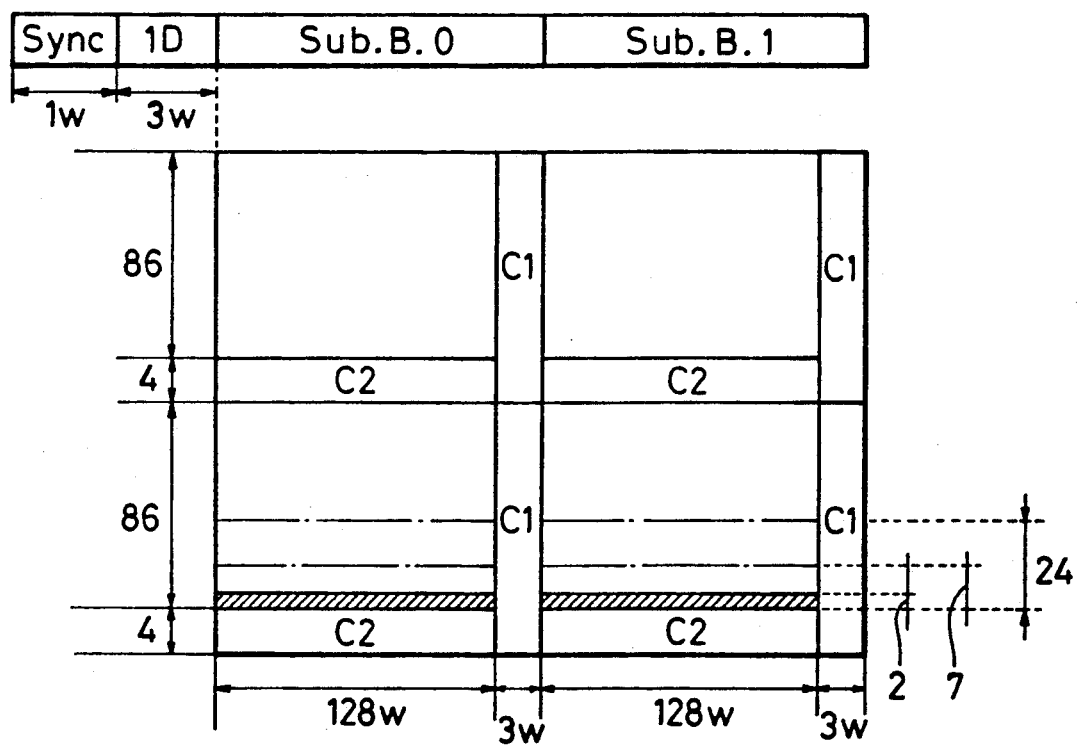
FIG. 3 is a diagram showing a data recording format by the data recorder in FIG. 1.

In FIG. 3, there is shown a data format covering one track of the DDR of the present embodiment. The same format can also be used when either one of the above-described three kinds of digital signals is recorded. As is shown in FIG. 3, in the DDR of the present embodiment, $(128 \times 4)$ words of C2 parity (internal code) and $(3 \times 90)$ words of C1 parity (external code) are added to data of $(128 \times 86)$ words, and four of this data matrix constitute a data block covering one track. Hence, the data capacity covering one track consists of $(256 \times 172)$ bytes.

Since $(256 \times 170)$ bytes suffice in order to record a digital signal of 139.264 Mbps, $(256 \times 2)$ bytes, the hatched area in FIG. 3, are utilized as a subcode.

When a digital signal of 135.168 Mbps is to be recorded, the amount of data necessary to be recorded in one track is $(256 \times 165)$ bytes according to a similar calculation. Also, $(256 \times 7)$ bytes are utilized as a subcode, and so the area occupied by data indicating the digital signal within the data block becomes narrow. When a digital signal of 120.6 Mbps is to be recorded, the amount of data necessary to be recorded in one track is less than $(256 \times 148)$ bytes. Hence, data indicating the digital signal are disposed up to the midsection of the 152nd data block, and at least $(256 \times 24)$ bytes are utilized as a subcode.

Thus, no matter what bit rates a digital signal to be recorded has, by means of switching the dimensions of the area occupied by data indicating the digital signal (termed hereinafter the main data) within the data block, it becomes unnecessary to change recording bit rates, and the recording data format can also be made common.

Accordingly, a read clock signal having an identical frequency can be used for the RAM 7 irrespective of any input signal. A frequency divider 8 performs frequency division of the write clock signal which is output from the selector 5 so as to become $(4000n/60)$ Hz (n is an integer), and supplies the resultant clock signal to a PLL 10 circuit and a drum servo circuit 11 in the rear stage. The drum servo circuit 11 performs rotation control of the drum 50 using an output of a phase detector 13 of the drum and an output of the frequency divider 8. When n is 1, the frequency dividing ratio of the frequency divider 8 is one $(17.408 \times 10^6 \times 60/4000 =)$ 261120-th when a digital signal of 139.264 Mbps is input, one $(16.896 \times 10^6 \times 60/4000 =)$ 253440-th when a digital signal of 135.168 Mbps is input, and one 226125-th when a digital signal of 120.6 Mbps is input. The frequency dividing ratio of the frequency divider 8 is determined by data obtained from a frequency dividing ratio setting circuit 9 based on data relative to a preassigned input which is output from the system controller 3. The frequency dividing ratio setting circuit 9 may have a configuration, for example, which consists of a look-up table, and outputs preset data of a counter within the frequency divider 8.

The frequency of the clock signal necessary as the read clock signal when recorded data as shown in FIG. 3 are serially read out from the RAM 7 is $(4000 \times 6 \times 256 \times 172/60 \approx)$ 17.603 MHz, which can be obtained by multiplying the $(4000n/60)$ Hz clock signal which the frequency divider 8 outputs by the PLL 10.

The word number of the main data within each data block of the RAM 7 is written in a predetermined position in the above-described subcode area by a subcode addition circuit 12. The subcode addition circuit 12 is controlled by preassigned input data from the system controller 3.

Data read out from the RAM 7 are distributed to three-channel recording systems in a data-block unit, and supplied to error correction code encoders (ECC. EN.) 15a, 15b and 15c for adding the above-described C1 and C2 parities, Sync. and ID, and further to each head via digital modulators 16a, 16b and 16c. As shown in FIG. 1, the heads Ha and Hd, Hb and He, Hc and Hf, become recording heads of the same channel, respectively.

Figure 4:
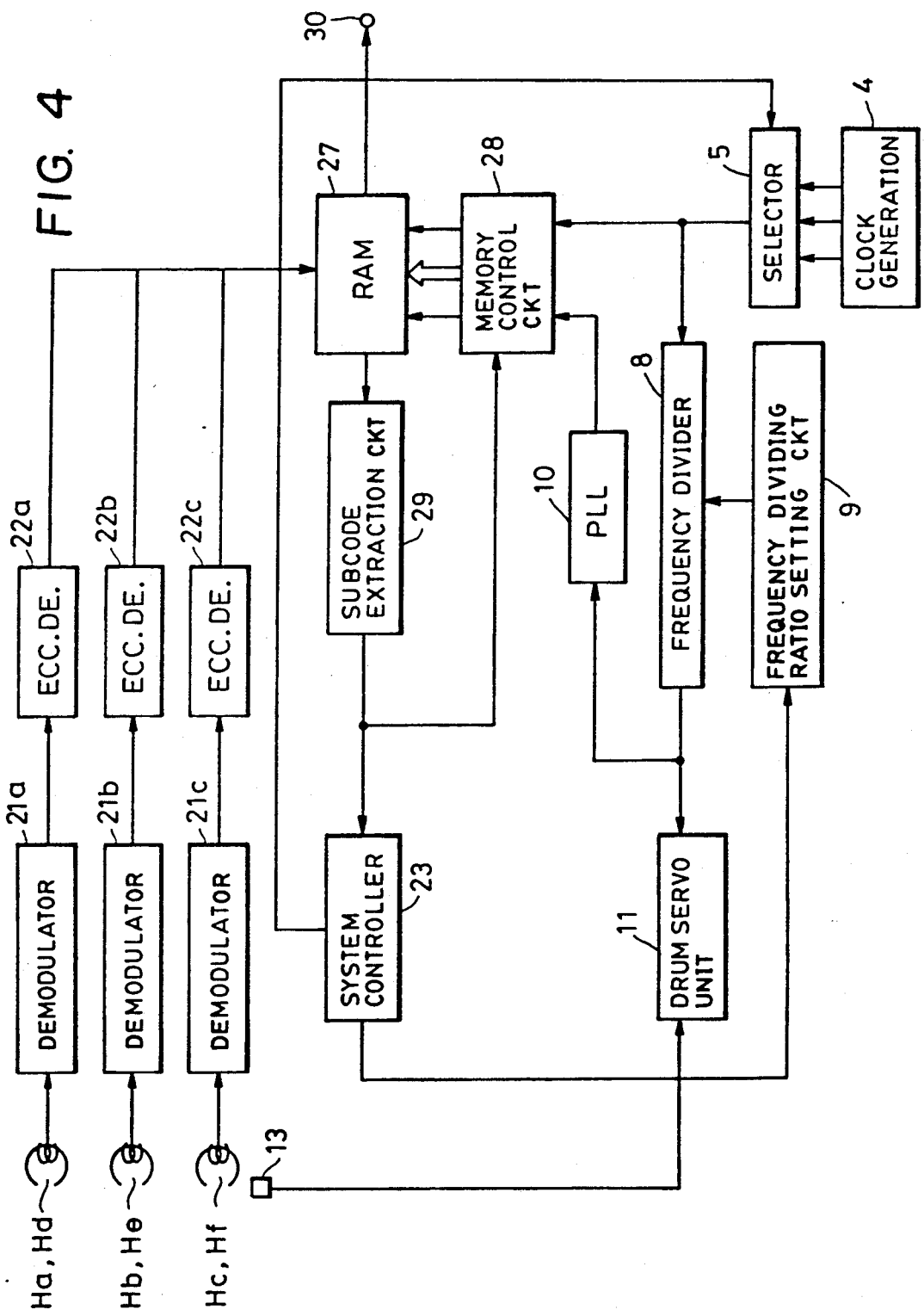
FIG. 4 is a diagram showing the configuration of a reproducing system of the data recorder corresponding to FIG. 1.

Next, the reproducing system will be explained with reference to FIG. 4. In FIG. 4, like components as those in FIG. 1 are indicated by like numerals. Three-channel reproduced signals reproduced by each head are demodulated by digital demodulators 21a, 21b and 21c, and then subjected to error correction by C1 and C2 parities and the like by error correction code demodulators 22a, 22b and 22c, and serially written into a RAM 27.

As described above, from the RAM 27, data indicating the word number of the main data disposed in a predetermined position within each data block are extracted by a subcode extraction circuit 29, and are supplied to a system controller 23 and a memory control circuit 28. The system controller 23 determines the kind of the recorded digital signal by data indicating the word number of the main data, and controls the selector 5 and the frequency dividing ratio setting circuit 9. The selector 5 thereby makes the clock signal corresponding to the original bit rate of the recorded digital signal the read clock signal, and supplies it to the memory control circuit 28. This clock signal is frequency-divided by the frequency divider 8 with a frequency dividing ratio determined by the frequency dividing ratio setting circuit 9 so as to be $(4000n/60)$ Hz, and the resultant clock is supplied to the drum servo circuit 11 and the PLL circuit 10.

The output of the PLL circuit 10 is supplied to the memory control circuit 28 as the 17.603 MHz write clock signal. The RAM 27 is controlled by the memory control circuit 28 relative to the write and read timings and address, and outputs the reproduced digital signal from an output terminal 30 according to the original bit rate of the digital signal.

In the DDR of the embodiment described above, each unit of the signal processing system and the servo system from the RAM 7 up to the heads in the recording system performs the entirely same processing no matter when a signal having any bit rate is input. Hence, it becomes possible to record all of plural kinds of the digital signals having different bit rates without increasing the scale of the apparatus compared with the conventional DDR. The situation is the same for the reproducing system, in which the scale of the apparatus is not increased either.

In addition, by disposing and recording the number of the main data within each data block in the subcode area, it is possible to instantaneously know the address in which the main data and subcode written in the RAM 27 as a buffer memory are disposed, when reproducing. It is also possible to know the original bit rate of the digital signal, and automatically restore the original digital signal. Moreover, since error correction by C1 and C2 parities has been performed to the above-described data indicating the number of the main data, reproduction with a high reliability can automatically be performed.

Although, in the above-described embodiment, a multi-channel data recorder has been illustrated, and high-definition video signals have also been illustrated as digital signals to be recorded, the present invention can naturally be applied to a single-channel data recorder in which other digital signals are recorded.

Furthermore, although, in the above-described embodiment, explanation has been provided only for the case in which the bit rate of the digital signal to be handled is an integer multiple of the number of rotation of the heads, it is not limited thereto, but the bit rate of the digital signal to be recorded is arbitrary. When the bit rate of the digital signal to be recorded is not an integer multiple of the number of rotation of the heads, it is necessary to switch the number of the main data for every track. This processing can be handled by recording the number of the main data within the data block.

Figure 5:
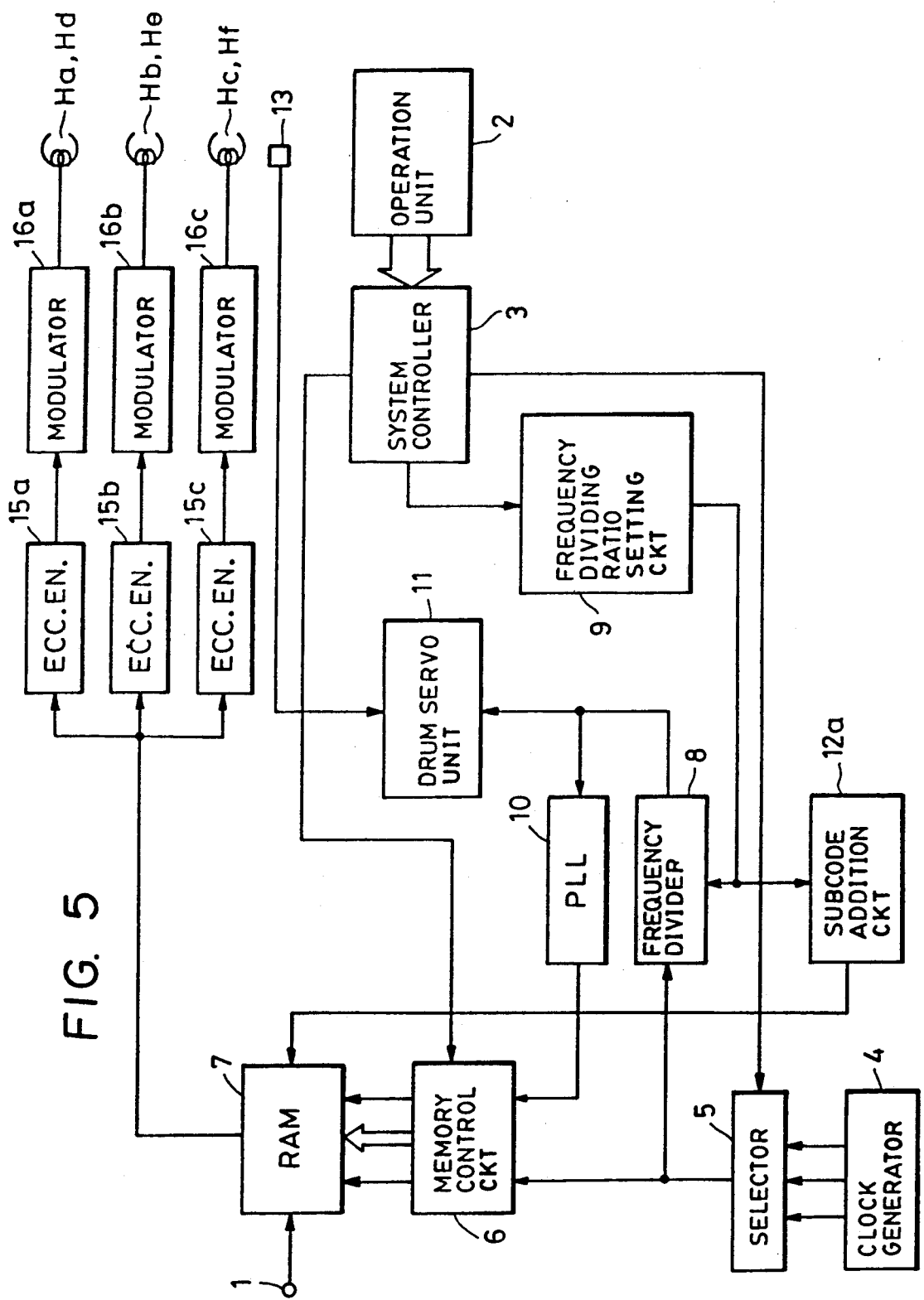
FIG. 5 is a diagram showing the configuration of a recording system of a data recorder as another embodiment of the present invention.

FIG. 5 is a diagram showing the configuration of a recording system of a data recorder as another embodiment of the present invention. In FIG. 5, like components as those in FIG. 1 are indicated by like numerals, and explantion thereof will be omitted.

In FIG. 5, a subcode addition circuit 12a writes the frequency dividing ratio of the variable frequency divider 8, that is, data which the frequency dividing ratio setting circuit 9 outputs, in a predetermined position within the above-described subcode area.

The configurations of other units are the same as those in FIG. 1.

Figure 6:
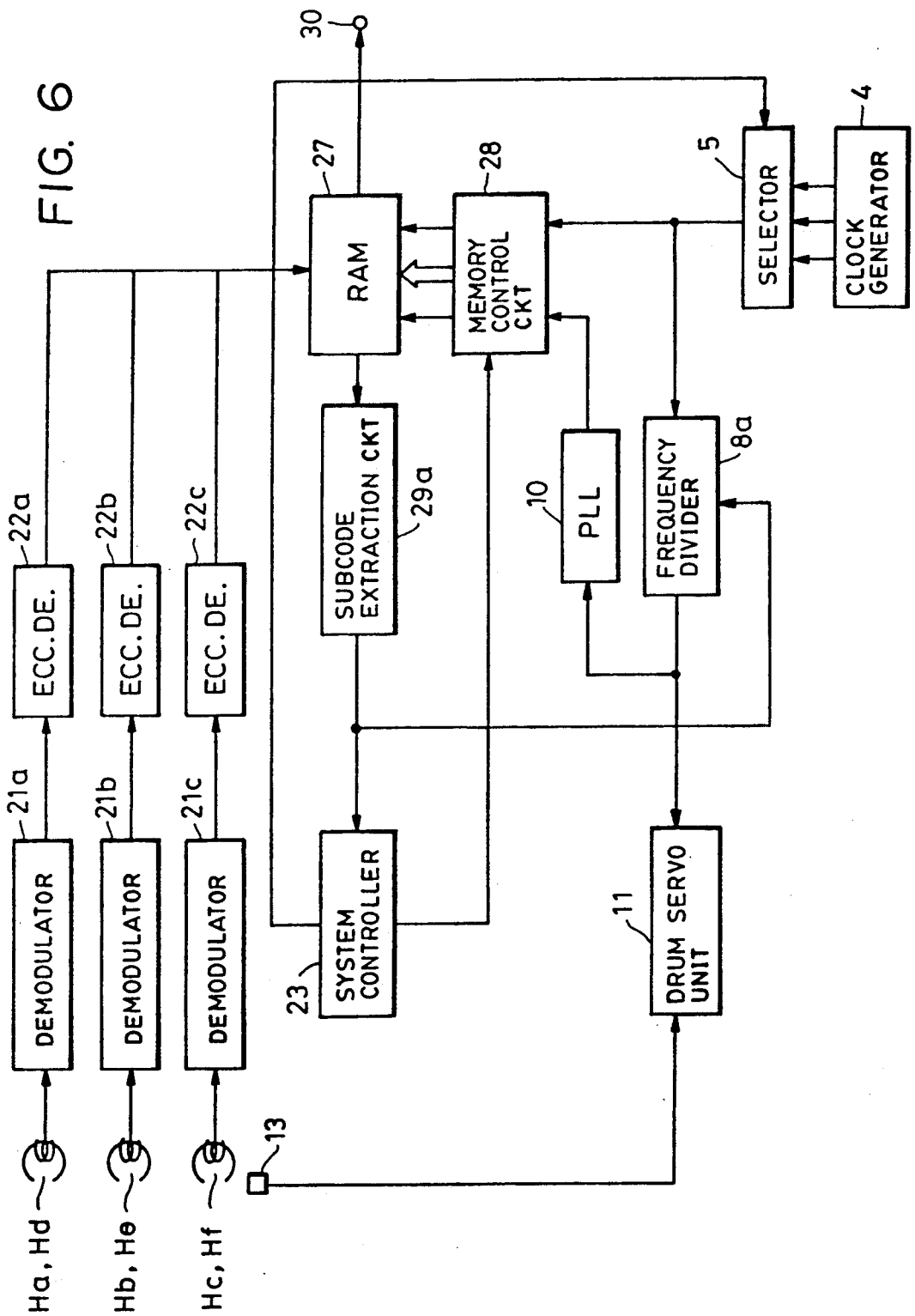
FIG. 6 is a diagram showing the configuration of a reproducing system of the data recorder corresponding to FIG. 5.

FIG. 6 is a diagram showing the configuration of a reproducing system of the data recorder corresponding to the recording system in FIG. 5. In FIG. 6, like components as those in FIG. 4 are indicated by like numerals, and explanation thereof will be omitted.

As described above, in the RAM 27, data indicating the frequency dividing ratio of the variable frequency divider disposed at a predetermined position within each data block are extracted by a subcode extraction circuit 29a, and supplied to a system controller 23 and a variable frequency divider 8a. The system controller 23 determines the kind of the recorded digital signal according to the above-described data indicating the frequency dividing ratio, and controls the selector 5 and the memory control circuit 28.

The selector 5 thereby makes the clock signal corresponding to the original bit rate of the recorded digital signal the read clock, and supplies it to the memory control circuit 28. The memory control circuit 28 receives this clock signal and address preset data from the system controller 23, and controls the address, and read and write timings of the RAM 27. This clock signal is also frequency-divided by a frequency divider 8a with the frequency dividing ratio indicated by data extracted at a subcode extraction circuit 29a, that is, made the $(4000n/60)$ Hz clock signal, which is supplied to the drum servo circuit 11 and the PLL circuit 10.

In the DDR of the above-described embodiment, by disposing and recording data indicating the frequency dividing ratio when a clock signal having a frequency corresponding to the bit rate of the input digital signal is frequency-divided into a clock signal having a frequency corresponding to the number of rotation of the drum in the subcode area when recording, it is possible to perform the same frequency division using these data when reproducing. It is also possible to know the original bit rate of the recorded digital signal, and automatically restore the original digital signal. Furthermore, since error correction by C1 and C2 parities can be performed to the above-described data, reproduction with a high reliability can automatically be performed.

When the bit rate of the digital signal to be recorded is not an integer multiple of the number of rotation of the heads, similar processing can be performed by making the frequency dividing ratio a fraction of an integer while making the clock for drum servo (4000n/60) ±α (Hz), and without changing the number of the main data per track, as in another embodiment to be described later.

Figure 7:
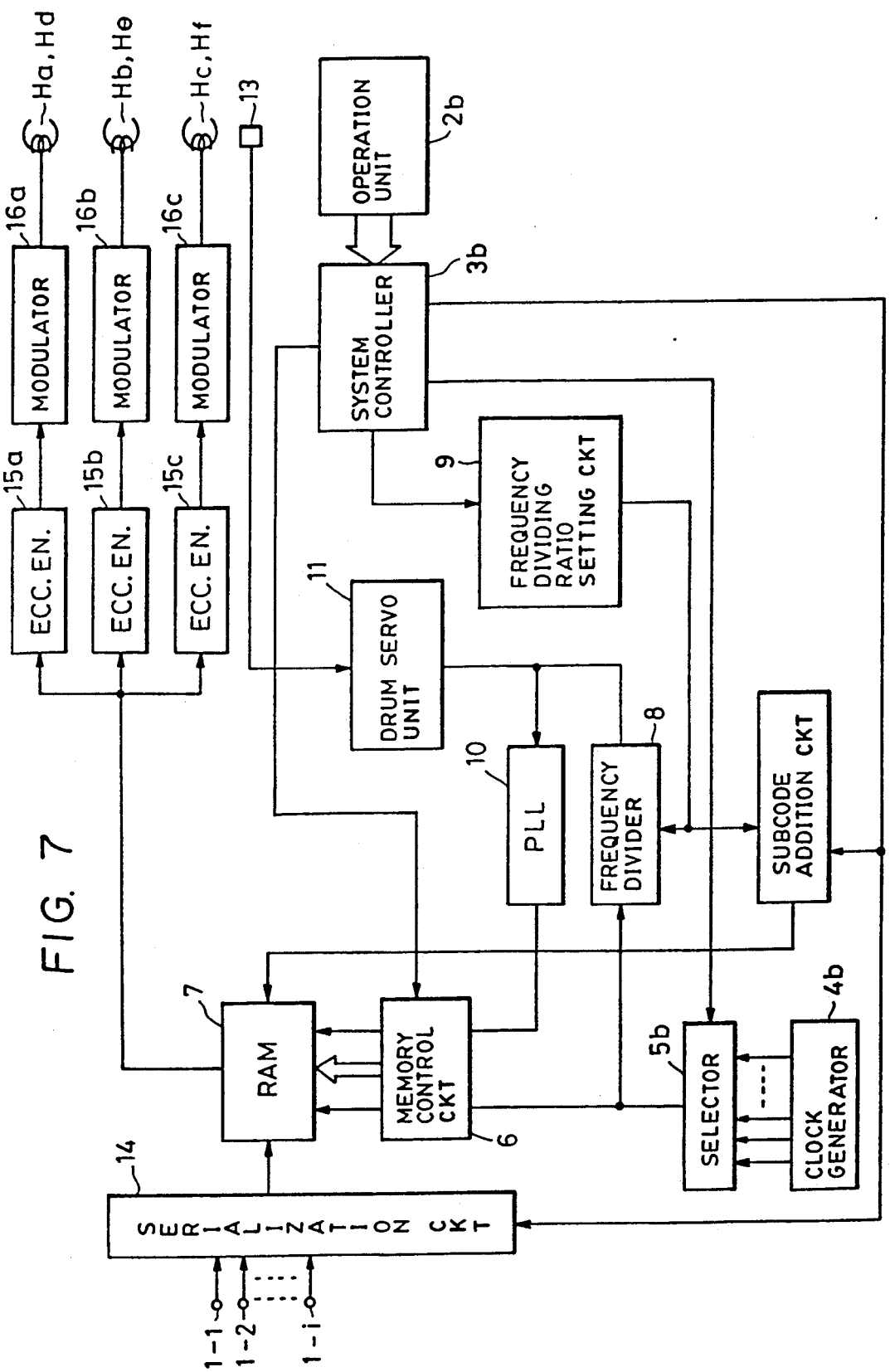
FIG. 7 is a diagram showing the configuration of a recording system of a data recorder as still another embodiment of the present invention.

FIG. 7 is a diagram showing the configuration of a recording system of a data recorder as still another embodiment of the present invention. In FIG. 7, like components as those in FIG. 5 are indicated by like numerals, and explanation thereof will be omitted.

In FIG. 7, there are shown input terminals 1-1-1-i of digital signals, respectively. In the data recorder of the present embodiment, it is assumed that, as input digital signals, 1-channel digital signals of 139.264 Mbps, 135.168 Mbps and 120.816 Mbps, 1-4-channel digital signals of 34.816 Mbps, and 1-3-channel digital signals of 40.2 Mbps can be input.

An operation unit 2b is configured so that the user can assign digital signals to be input to the input terminals 1-1-1-i (i=4 in the present embodiment). The user selects one kind of input signal from the above-described ten kinds of input signals. The operation unit 2 supplies control data inclusive of data relative to the above selection to a system controller 3b. The system controller 3b outputs data for controlling each unit of the appartus in accordance with the above-described control data.

When the operation unit 2b has selected to perform recording of j-channel ($1 \leq j \leq i$) digital signals, a serialization circuit 14 outputs 8-bit digital signals which have been input to the input terminal 1-1-1-j sequentializing by one word based on data indicating j from the system controller 3b. When j=1, the digital signal input to the input terminal 1-1 is skewed.

A clock generator 4b outputs clock signals having frequencies corresponding to all bit rates which the digital signals output from the serilization circuit 14 can have, in parallel. Now, suppose that the serialization circuit 14 outputs 8-bit output data. Then, frequencies generated by the clock generator 4b consist of eight kinds, that is, 4.352 NHz, 8.704 MHz, 13.056 MHz, 17.408 MHz, 5.025 MHz, 10.05 MHz, 15.075 MHz and 16.896 MHz.

A selector 5b selects and outputs one clock signal from the above-described eight kinds of clock signals according to the output of the system controller 3b based on the input assignment by the operation unit 2b, and supplies it to the memory control circuit 6.

The subsequent processing when the digital signal of 34.816 Mbps is recorded in four channels is the same as the processing when the digital signal of 139.264 Mbps is recorded, and the subsequent processing when the digital signal of 40.2 Mbps is recorded in three channels is the same as the processing when the digital signal of 120.6 Mbps is recorded.

The total bit rates when the digital signal of 34.816 Mbps is recorded in 1-3 channels are 34.816 Mbps, 69.632 Mbps and 104.448 Mbps, and the total bit rates when the digital signal of 40.2 Mbps is recorded in 1-2 channels are 40.2 Mbps and 80.4 Mbps. Hence, the dimensions of the area occupied by the main data indicating the digital signal within the data block are switched according to these total bit rates. Consequently, the frequency dividing ratio of the frequency divider 8 becomes one ($17.408 \times 10^6 \times 60/4000 =$) 261120-th when the digital signal having the total bit rate of 139.264 Mbps is input, one ($16.896 \times 10^6 \times 60/4000 =$) 253440-th when the digital signal having the total bit rate of 135.168 Mbps is input, one 226125-th when the digital signal having the total bit rate of 120.6 Mbps is input, one 65280-th in the case of 34.816 Mbps, one 130560-th in the case of 69.632 Mbps, one 195840-th in the case of 104.448 Mbps, one 75375-th in the case of 40.2 Mbps, and one 150750-th in the case of 80.4 Mbps.

In a predetermined position within the above-described subcode area, data indicating the frequency dividing ratio set by the frequency dividing ratio setting circuit 9 and data indicating the number j of input channels are written by a subcode addition circuit 12b.

Figure 8:
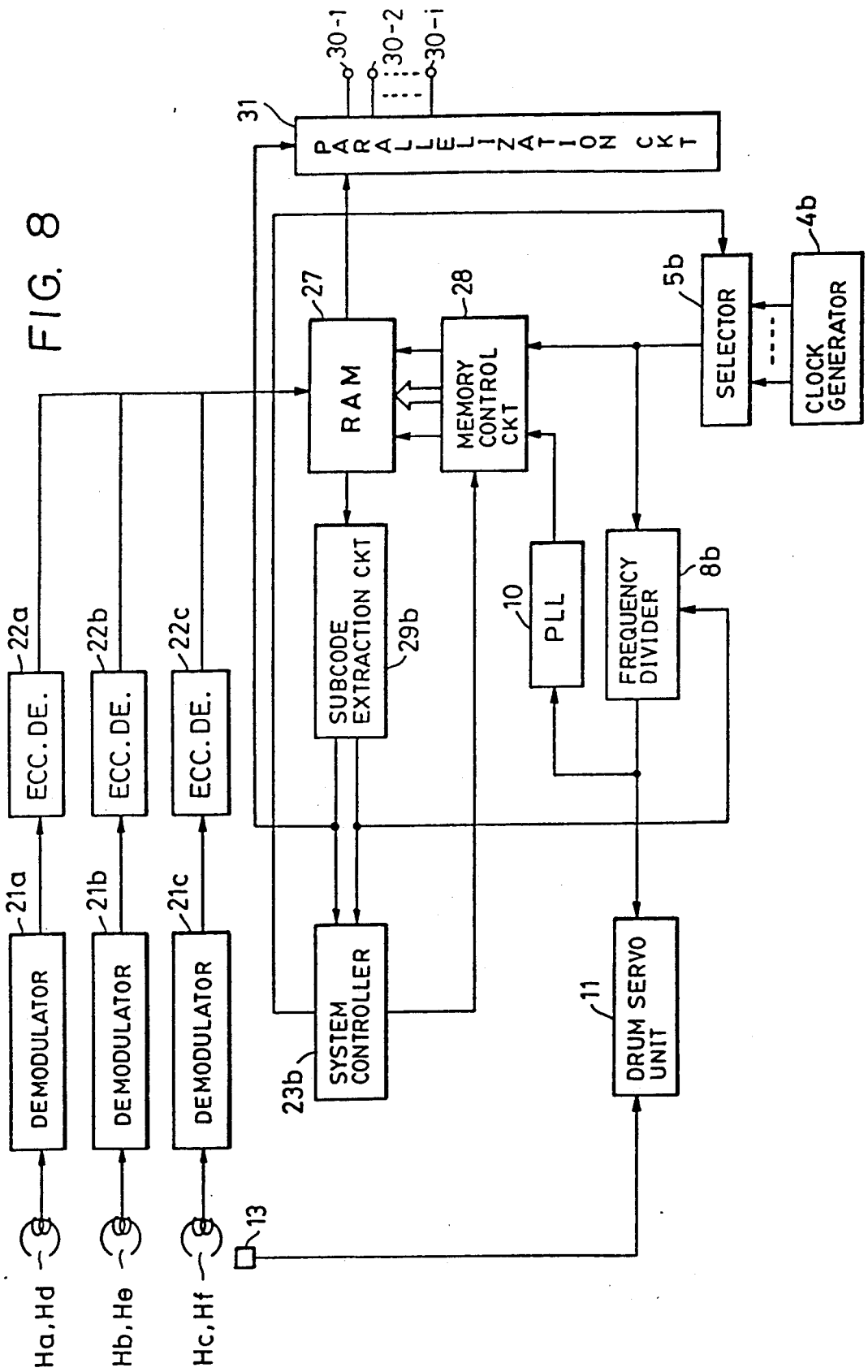
FIG. 8 is a diagram showing the configuration of a reproducing system of the data recorder corresponding to FIG. 7.

FIG. 8 is a diagram showing the configuration of a reproducing system corresponding to the recording system in FIG. 7. In FIG. 8, like components as those in FIG. 6 are indicated by like numerals.

As described above, data indicating the frequency dividing ratio disposed in a predetermined position within each data block and data indicating the number j of channels are extracted by a subcode extraction circuit 29b, and supplied to a variable frequency divider 8b and a parallelization circuit 31 in the rear stage, respectively. These data are also supplied to a system controller 23b. The system controller 23b determines the kind of the recorded digital signal according to the above-described data indicating frequency dividing ratio and data indicating the number of channels, and controls a selector 5b and the memory control circuit 28.

The RAM 27 is controlled by the memory control circuit 28 relative to the write and read timings, and address, and supplies them to a parallelization circuit 31 according to the total bit rate of the original digital signal. The parallelization circuit 31 restores the input data to j-channel digital signals according to data indicating the number j of channels extracted by a subcode extraction circuit 29b, and outputs the resultant signals from output terminals 30-1 - 30-j.

In the DDR of the embodiment described above, each unit of the signal processing system and the servo system from the RAM 7 up to the heads in the recording system performs the entirely same processing no matter when a signal having any bit rate is input. Hence, it becomes possible to record all of the plural kinds of digital signals having different bit rates without increasing the scale of the apparatus compared with the conventional DDR. The situation is the same for the reproducing system, in which the scale of the apparatus is not increased either.

Furthermore, by disposing and recording data indicating the number of channels of the digital signal to be recorded and data indicating the frequency dividing ratio of the frequency divider for making the clock signal having a frequency corresponding to the total bit rate of the input digital signal the clock signal having a predetermined frequency within each data block, it is possible to automatically determine the frequency dividing ratio of the variable frequency divider of the reproducing system, and it is also possible to determine the number of channels and total bit rate of the recorded digital signal. Hence, it is possible to automatically restore the original digital signal. Moreover, since error correction codes by C1 and C2 parities are added to these data, it is possible to reliably detect the number of channels and the like.

As described above, according to the data recorders shown in FIGS. 7 and 8, no matter when a digital signal of any number of channels is input, it is possible to handle the signal if only the bit rate is within the range of tolerance, and so the data recorders can be widely applied.

Figure 9:
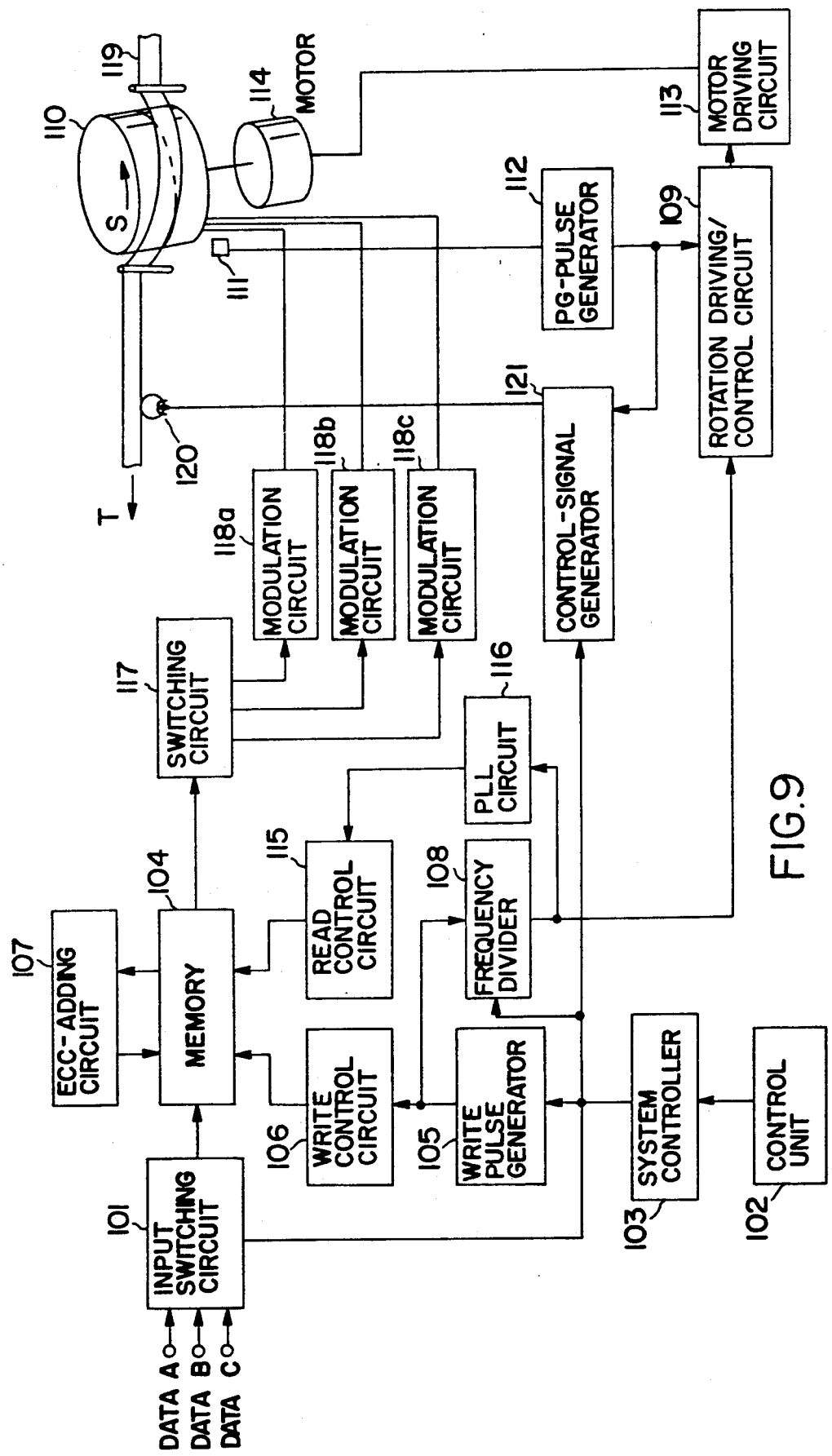
FIG. 9 is a diagram showing the configuration of a recording system of a data recorder as still another embodiment of the present invention.

FIG. 9 is a diagram showing the schematic configuration of a recording unit of a data recorder to which the present invention is applied as still another embodiment of the present invention.

In FIG. 9, to an input switching circuit 101, it is possible to input, for example, data A, data B and data C having different bit rates from one another, as illustrated. The input switching circuit 101 supplies either one kind of data among these three kinds of data to a memory 104 in the next stage, according to mode data from the system controller 3, which will be described later. Due to operation on an operation unit 102 by the operator, a recording mode for recording either one kind of data among the above-described three kinds of data is selected. When the result of the selection is supplied to a system controller 103, the system controller 103 outputs mode data corresponding to the result of the selection from the operation unit 102.

A write pulse generator 105 generates clock pulses for a data write signal having a frequency corresponding to the data rate of the data which have been output from the input switching circuit 101 in accordance with the mode data, and supplies them to a write control circuit 106.

The write control circuit 106 assigns the write address to the memory 104, in synchronization with these clock pulses for data write, and stores data which have been output from the input switching circuit 101 in a predetermined address within the memory 104.

When the input data have been stored in the memory 104 as described above, the well-known error detection/correction data are generated to data stored in the memory 104 by an ECC (Error Correction Code)-adding circuit 107, and stored in an address for error detection/correction data within the memory 104.

The pulses for data write which are output from the write pulse generator 105 are also supplied to a frequency divider 108, and frequency-divided with a predetermined frequency dividing ratio. The resultant pulses are supplied to a rotation driving control circuit 109. In the data recorder of the present embodiment, a magnetic piece (not illustrated) is provided on the circumference of a rotating cylinder 110 provided with rotating heads. A PG coil 111 outputs a pulse every time the magnetic piece passes it. A PG-pulse generator 112 performs wave shaping of pulses output from the PG coil 111, and supplies the wave-shaped pulses to the rotation driving control circuit 109 as a PG-pulse signal indicating the rotation period of the rotating cylinder 110.

The pulse signal frequency-divided by the frequency divider 108 and the above-described PG-pulse signal are supplied to the rotation driving control circuit 109, which outputs a rotation driving control signal to a motor driving circuit 113 so that the PG-pulse signal is synchronized in phase with the frequency-divided pulse signal.

The motor driving circuit 113 then rotates a motor 114 so that the rotating cylinder 110 is rotated with a rotation period corresponding to the rotation driving control signal which is output from the rotation driving control circuit 109. By the above-described operation, the rotation period of the rotation cylinder 110 is synchronized with the pulse signal obtained from the frequency divider 8.

Now, the frequency dividing ratio N of the frequency divider 108 corresponds to the bit number of input data recorded during one rotation of the rotating cylinder 110. That is, when the frequency dividing ratio N is made constant irrespective of the data mode, the bit number of data input during one rotation of the rotating cylinder 10 becomes identical. Hence, processing of data in the memory 104 can be completely identical. That is, the frequency dividing ratio N corresponds to the number of data which are input during one rotation of the rotating cylinder 110. It can be said that this is extremely effective when there is little difference among the bit rates of the input data A, B and C.

When the bit rates of the input data A, B and C considerably differ from one another, however, there appears a considerable difference in the number of rotations of the rotating cylinder. This is not preferable when response characteristics of the electromagnetic conversion system and the like are taken into consideration. In this case, the frequency dividing ratio N is to be switched in accordance with input data. This processing will be hereinafter investigated.

Suppose that the bit rates of the data A, B and C are Da, Db and Dc (bps), respectively, and the frequency dividing ratios of the frequency divider 108 when the data A, B and C are input as input data are Na, Nb and Nc (Na, Nb and Nc are all integers), respectively. When Da/Na, Db/Nb and Dc/Nc have different values from one another, the rotation period of the rotating cylinder 110 is switched in accordance with the data mode. The bit number of data which are input during one rotation of the rotating cylinder 110 at each mode can be made constant, and the frequency dividing ratios Na, Nb and Nc correspond to the number of bits which are input during one rotation of the rotating cylinder 110. Now, in the case of a configuration in which nc-channel digital signals are simultaneously recorded using the rotating cylinder 110, if Na, Nb and Nc are made a multiple of nc (an integer no smaller than 2), respectively, the bit number of input data recorded in each channel during one rotation of the rotating cylinder 110 at each mode can be made constant. If Na, Nb and Nc are made a multiple of 8, respectively, the number of bytes of input data recorded during one rotation of the rotating cylinder 110 at each mode can be made constant. In the data recorder of the present embodiment, three channels are simultaneously recorded. Hence, it desirable that Na, Nb and Nc are made a multiple of 24, respectively, and the number of bytes of input data recorded in each channel during one rotation of the rotating cylinder 110 is made constant at each mode.

Furthermore, when ne is the number of ECC blocks recorded during one rotation of the rotating cylinder 110, and ns is the number of synchronous blocks, the number of bytes within each ECC block can be made constant if Na, Nb and Nc are made a multiple of 8ne, respectively, and the number of bytes within each synchronous block can also be made constant if Na, Nb and Nc are made a multiple of 8ns, respectively. Moreover, the scale of the circuit can be made small.

On the other hand, under the state in which error detection/correction data are added by the ECC-adding circuit 107, the read control circuit 115 assigns read addresses for data stored in the memory 104, and the data are sequentially read from the memory 104 and supplied to a switching circuit 117. At this time, the read control circuit 115 inputs a clock signal which has been synchronized in phase with the pulse signal output from the frequency divider 108 by a PLL circuit 116, and sequentially sets read addresses in synchronization with the clock signal.

The PLL circuit 116 multiplies pulse signals which the frequency divider 108 outputs. It is necessary to set the number of the multiplier M larger than the frequency dividing ratio N by the amount of redundant data, such as ECC and the like. When the frequency dividing ratio N is switched as Na, Nb and Nc in accordance with mode data, the number of the multiplier M is set larger than the maximum number among Na, Nb and Nc.

Two pairs of three rotating magnetic heads for simultaneously scanning the magnetic tape are mounted to the rotating cylinder 110 at positions opposing 180 degrees to each other. They are configured such that data are recorded on the magnetic tape by alternately supplying data read out by the memory 104 at every time interval which corresponds to half the rotation period of the rotating cylinder 110 to the two pairs of magnetic heads.

Data read out by the memory 104 are then divided into three parts by the switching circuit 117 configured by a well-known latch circuit and the like, and each of the divided data is simultaneously supplied to the modulation circuits 118a, 118b and 118c in the next stage, respectively.

In the modulation circuits 118a, 118b and 118c, data from the switching circuit 117 are subjected to digital modulation, for example, the well-known NRZI modulation or the like, and converted into a signal form which is suitable for magnetic recording. Each of the outputs of the modulation circuits 118a, 118b and 118c is supplied to each of the magnetic heads as described above via a rotary transformer (not illustrated), respectively, and recorded on a magnetic tape 119 fed in the direction of the arrow T in FIG. 9, by a tape-feeding mechanism (not illustrated) including a capstan and the like.

On the magnetic tape 119, there is provided a control track in the longitudinal direction of the magnetic tape 119. A rectangular-wave signal (termed hereinafter control signal) which rises in synchronization with the rotation period of the rotating cylinder 110 is recorded on the control track using a fixed magnetic head 120. The control signal is formed at a control-signal generator 121, to which mode data and a PG-pulse signal are supplied. The control-signal generator 121 generates the control signal in synchronization with the PG-pulse signal, and changes the duty ratio of the rectangular wave in accordance with mode data, in order to indicate to which data among three kinds of data (data A, data B and data C) having different data rates the data to be recorded on the magnetic tape 119 belongs.

Figures 10, 10A:
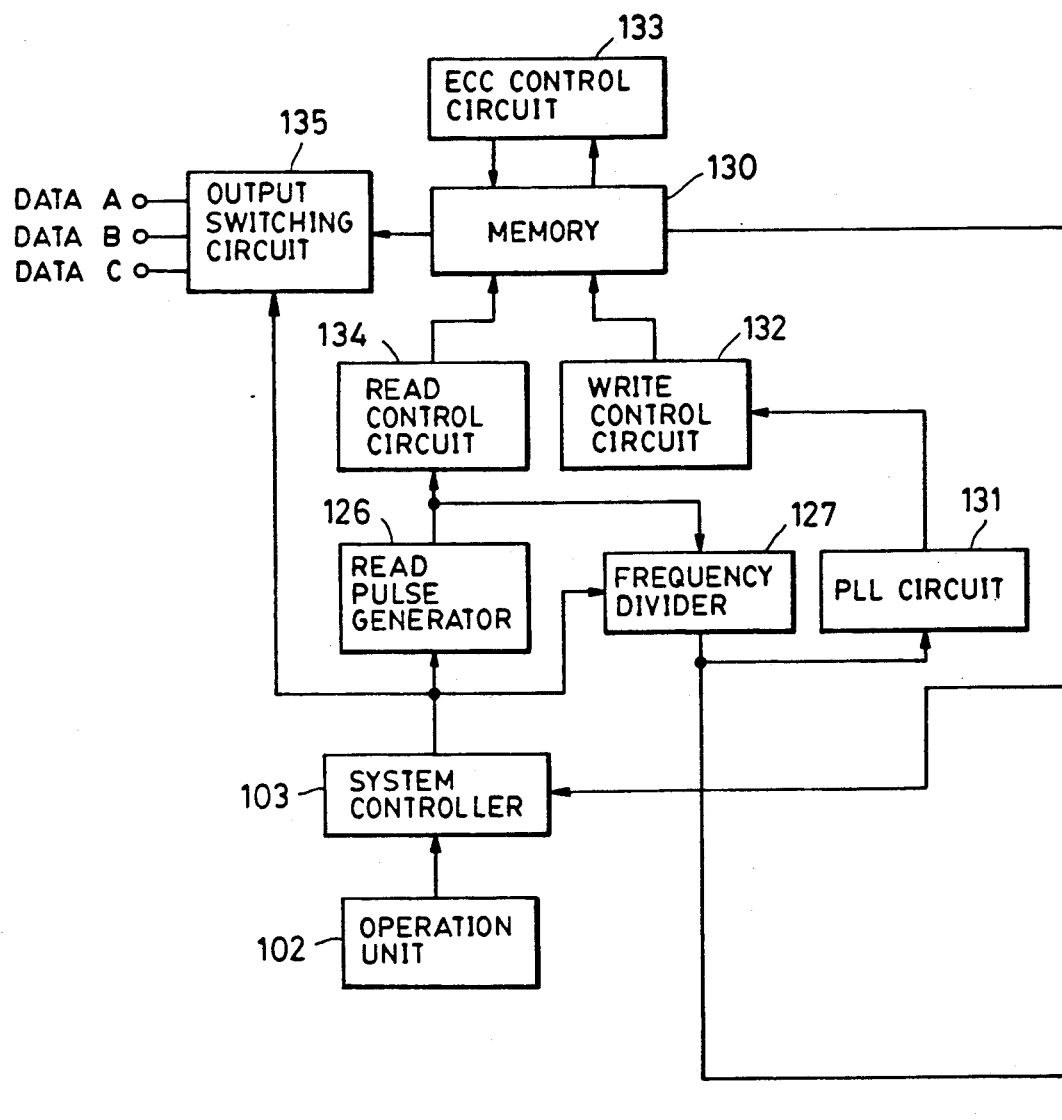
FIGS. 10A and 10B are diagrams showing the configuration of a reproducing system of the data recorder corresponding to FIG. 9.
Figure 10B:
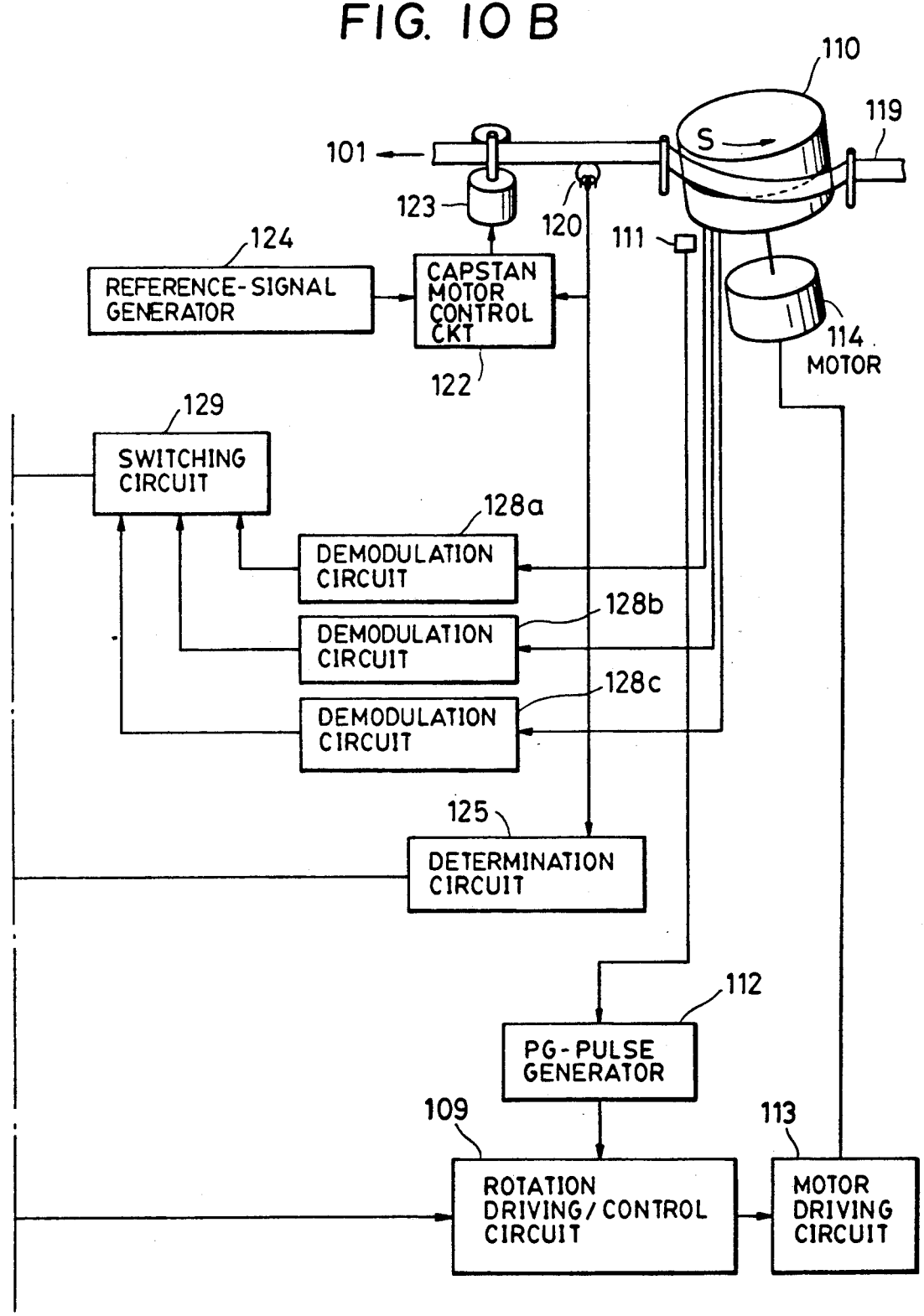

FIGS. 10A and 10B are diagrams showing the schematic configuration of a reproducing unit of the data recorder in FIG. 9. In FIG. 10, like components as those in FIG. 9 are indicated by like numerals, and detailed explanation thereof will be omitted.

In FIGS. 10A and 10B, when the operator selects a reproducing operation by the operation unit 102, a capstan motor control circuit 122 is operated according to an instruction from the system controller 103, to start rotation of a capstan motor 123.

On the other hand, to the capstan-motor control circuit 122, a reference signal is supplied by a reference-signal generator 124, and a control signal which is reproduced from the control track of the magnetic tape 119 by the fixed magnetic head 120 is also supplied. The capstan-motor control circuit 122 controls rotation of the capstan motor 123 so that the reference signal is synchronized with the rise of the control signal.

The control signal reproduced by the fixed magnetic head 120 is also supplied to a determination circuit 125, which determines to which data having a certain data rate among data A, data B and data C data recorded on the magnetic tape 119 belongs, by determining the duty ratio of the control signal, and supplies the determination signal to the system controller 103.

The system controller 103 outputs mode data to a read pulse generator 126 according to the determination signal supplied from the determination circuit 125, and has the read pulse generator 126 output pulses for data read-out corresponding to the data rate to be output. The pulses for data read-out are supplied to a frequency divider 127, and pulses frequency-divided at the frequency divider 127 with the frequency dividing ratio N, or Na, Nb and Nc, as described above in detail, are supplied to the rotation driving control circuit 109.

To the rotation driving control circuit 109, the PG-pulse signal is also supplied other than the above-described frequency-divided pulse signal, as in the case of recording. The rotation driving control circuit 109 supplies the control signal to the motor driving circuit 113 in order to synchronize the PG-pulse signal with the frequency-divided pulse signal to rotate the motor 114, and controls rotation of the rotating cylinder 110.

After rotation of the rotating cylinder 110 has been controlled, as described above, and has become under a stationary state, data which have been digitally modulated when recording are reproduced from the magnetic tape 119 by a magnetic head (not illustrated) provided at the rotating cylinder 110, and supplied to demodulation circuits 128a, 128b and 128c. Data demodulated by the demodulation circuits 128a, 128b and 128c are converted into a serial row of data by the switching circuit 129 configured by a latch circuit and the like, and supplied to the memory 130.

The pulse signal which is output from the frequency divider 127 is also supplied to a PLL circuit 131, which outputs the clock signal synchronized in phase with the frequency-divided pulse signal and having the M-times frequency described before. A write control circuit 132 stores data supplied from the switching circuit 129 in the memory 130, in synchronization with the clock signal.

When data have been stored in the memory 130 as described above, an ECC control circuit 133 performs error correction processing of data, using error detection/correction data relative to data stored in the memory 130. A read control circuit 134 assigns read addresses of error-corrected data, making pulses for data read-out which are output from the read pulse generator 126 a clock signal, and data stored in the memory 130 are read out and supplied to an output switching circuit 135.

Mode data are supplied from the system controller 103 to the output switching circuit 135, and data read out from the memory 130 are output to an output terminal corresponding to the kind of data to be output.

As explained above, in the data recorder of the present embodiment, it is possible to simplify the configuration of a data processing circuit by an extremely simple configuration in which the rotation period of rotating heads is switched in accordance with the kind of input data having different bit rates from one another. The data recorder can also have a configuration in which any input data among plural kinds of inputs having different bit rates can be recorded.

As explained above, in the above-described embodiments shown in FIGS. 9 and 10, it is possible to record plural kinds of digital signals having different bit rates without complicating signal processing.

What is claimed is:

1. A digital signal recording apparatus comprising:
   input means for selectively inputting plural kinds of digital information signals corresponding to main data, wherein each of the plural kinds of digital signals has a different respective data rate;
   control means for providing control signals corresponding to the plural kinds of digital signals;
   blocking means for successively forming a data block comprising a fixed number of data, wherein the fixed number of data includes a predetermined number of main data corresponding to a digital information signal input to said blocking means by said input means;
   recording means for recording on a recording medium the data block input to said recording means from said blocking means; and
   switching means for switching the predetermined number of the main data within the data block within said blocking means to a number corresponding to each of the plural kinds of the digital information signals input to said blocking means from said input means in accordance with a control signal received by said switching means from said control means.

2. A digital signal recording apparatus according to claim 1, wherein said recording means is arranged so that the data block is recorded in one track.

3. A digital signal recording apparatus according to claim 1, wherein the data block comprises plural error correction code blocks and wherein each of the plural error correction code blocks comprises a predetermined number of data and an error correction code for the respective data.

4. A digital signal recording apparatus according to claim 1, further comprising:
   subdata recording means for recording subdata representing the predetermined number of the main data within the data block on the recording medium.

5. A digital signal recording apparatus according to claim 4, wherein said blocking means comprises means for forming the data block comprising the fixed number of data which includes the predetermined number of main data and the subdata.

6. A digital signal recording apparatus according to claim 1, further comprising:
   clock generation means for generating a clock signal having a frequency corresponding to the data rate of a digital information signal input from said input means; and
   frequency dividing means for frequency-dividing the clock signal.

7. A digital signal recording apparatus according to claim 6, wherein said recording means comprises plural recording heads rotating in synchronization with an output of said frequency dividing means.

8. A digital signal recording apparatus according to claim 7, further comprising:
   frequency dividing ratio switching means for switching a frequency dividing ratio of said frequency dividing means among plural frequency dividing ratios in accordance with each kind of digital information signal input from said input means.

9. A digital signal recording apparatus according to claim 8, further comprising:
   subdata recording means for recording subdata representing the frequency dividing ratio on the recording medium.

10. A digital signal recording apparatus according to claim 9, wherein said blocking means comprises means for forming the data block comprising the fixed number of data which includes the predetermined number of main data and the subdata.

11. A digital signal recording apparatus according to claim 9, wherein the main data comprise an n-bit data word, and each of the plural frequency dividing ratios is set at a predetermined integer multiple of n, respectively, where n is an integer greater than 1.

12. A digital signal recording apparatus according to claim 9, wherein said recording means comprises means for performing an m-channel recording, and each of the plural frequency dividing ratios is set at a predetermined integer multiple of m, respectively, where m is an integer greater than 1.

13. A digital signal recording apparatus according to claim 9, wherein the data block comprises plural error correction code blocks, wherein each of the plural error correction code blocks comprises a predetermined number of data and an error correction code for the respective data, wherein said recording means comprises means for recording i error correction code blocks per one rotation of said rotating heads, and wherein each of said plural frequency dividing ratios is set at a predetermined integer multiple of i, respectively, where i is an integer greater than 1.

14. A digital signal recording apparatus according to claim 8, wherein an output signal of said frequency dividing means has a constant frequency irrespective of the kind of digital information signals input from said input means.

15. A digital signal recording apparatus according to claim 8, wherein an output signal of said frequency dividing means has a different frequency depending on a kind of digital information signal input from said input means.

16. A digital signal recording apparatus according to claim 1, wherein said input means comprises means for simultaneously inputting j-channel digital information signals, and further comprises means for serializing the j-channel digital information signals, where j is an integer greater than 1.

17. A digital signal recording apparatus according to claim 16, further comprising:

subdata recording means for recording subdata representing the number j of channels of the digital information signals input from said input means on the recording medium.

18. A digital signal recording apparatus according to claim 17, wherein said blocking means comprises means for forming the data block comprising the fixed number of data which includes the main data and the subdata.

19. A digital signal recording apparatus according to claim 1, further comprising:

subdata recording means for recording subdata representing a kind of digital information signal input from said input means on the recording medium.

20. A digital signal recording apparatus according to claim 19, wherein said recording means records the data block in a first region on the recording medium and said subdata recording means records the subdata in a second region adjacent to the first region on the recording medium.

21. A digital signal recording apparatus comprising:

input means for inputting j-channel digital information signals in parallel, where j is an integer greater than 1, the j-channel digital information signals corresponding to main data;

subdata generation means for generating subdata indicating the number j of channels of the digital information signals input from said input means;

blocking means for successively forming a data block comprising a predetermined number of data, wherein the predetermined number of data includes main data corresponding to the j-channel digital information signals and the subdata generated by said subdata generation means; and recording means for recording the data block from said blocking means on a recording medium.

22. A digital signal recording apparatus according to claim 21, further comprising:

switching means for switching a number of the main data within the data block in accordance with the number j of channels of the digital information signals input from said input means.

23. A digital signal recording apparatus according to claim 21, wherein said input means comprises serialization means for serializing the j-channel digital information signals.

24. A digital signal recording apparatus according to claim 23, further comprising:

clock generation means for generating a clock signal having a frequency corresponding to a data rate of the digital information signal serialized by said serialization means; and frequency dividing means for frequency-dividing the clock signal, wherein said recording means comprises plural rotating heads rotating in synchronization with an output of said frequency dividing means.

25. A digital signal recording apparatus comprising:

input means for selectively inputting plural kinds of digital information signals corresponding to main data, wherein each of the plural kinds of digital information signals has a different respective data rate;

control means for providing control signals corresponding to the plural kinds of digital information signals;

clock generation means for generating a clock signal having a frequency corresponding to the respective data rate of a digital information signal input from said input means;

frequency dividing means for generating an output signal for frequency-dividing the clock signal;

frequency dividing ratio switching means for switching a frequency dividing ratio of said frequency dividing means to frequency dividing ratio corresponding to each kind of digital information signal input from said input means in accordance with a control signal output from said control means; and recording means for recording the digital information signal input from said input means on a recording medium, wherein said recording means comprises plural rotating heads rotating in synchronization with the output signal from said frequency dividing means.

26. A digital signal recording apparatus according to claim 25, further comprising:

subdata recording means for recording subdata representing the frequency dividing ratio on the recording medium.

27. A digital signal recording apparatus according to claim 26, further comprising:

blocking means for successively forming a data block comprising a predetermined number of data, wherein the predetermined number of data includes main data corresponding to the digital information signal input from said input means and the subdata.

28. A digital signal recording apparatus according to claim 25, wherein the main data corresponding to the digital information signal input from said input means comprises an n-bit data word, and each of the plural frequency dividing ratios is set at a predetermined integer multiple of n, respectively, where n is an integer greater than 1.

29. A digital signal recording apparatus according to claim 25, wherein said recording means comprises means for performing an m-channel recording and each of the plural frequency dividing ratios is set at a predetermined integer multiple of m, where m is an integer greater than 1.

30. A digital signal recording apparatus according to claim 25, wherein said recording means comprises means for recording i error correcting code blocks, wherein each of the error correcting code blocks comprises a predetermined number of data and an error correction code for the data per one rotation of said rotating heads, and wherein each of the plural frequency dividing ratios is set at a predetermined integer multiple of i, respectively, where i is an integer greater than 1.

31. A digital signal recording apparatus according to claim 25, wherein an output signal of said frequency dividing means has a constant frequency irrespective of the kind of digital information signals input from said input means.

32. A digital signal recording apparatus according to claim 25, wherein an output signal of said frequency dividing means has a different frequency corresponding to each kind of the digital information signals input from said input means.

33. A digital signal recording apparatus comprising:

input means for selectively inputting plural kinds of digital information signals, wherein each of the plural kinds of digital information signals has a different respective data rate;

control means for providing control signals corresponding to the plural kinds of digital information signals;

recording means for recording the digital information signal input from said input means on a recording medium, wherein said recording means comprises at least one recording head; and switching means for switching a rotation frequency of said at least one rotating head in accordance with a control signal provided by said control means.

34. A digital signal recording apparatus according to claim 33, wherein said switching means comprises:

clock generation means for generating a clock signal having a frequency corresponding to the data rate of the digital information signal input from said input means;

frequency dividing means for frequency-dividing the clock signal; and driving means for driving the rotation of said rotating heads using an output of said frequency dividing means.

35. A digital signal recording apparatus according to claim 34, wherein said frequency dividing means has a constant frequency dividing ratio irrespective of the kind of digital information signals input from said input means.

36. A digital signal recording apparatus according to claim 34, wherein an output signal of said frequency dividing means has a different frequency dividing ratio corresponding to each kind of digital information signals input from said input means.

37. A digital signal recording apparatus comprising:

input means for selectively inputting plural kinds of digital information signals corresponding to main data, wherein each of the plural kinds of digital signals has a different respective data rate;

control means for providing control signals corresponding to the plural kinds of digital signals;

blocking means for successively forming a data block comprising a predetermined number of main data corresponding to a digital information signal input to said blocking means by said input means;

recording means for recording on a recording medium the data block input to said recording means from said blocking means; and switching means for switching the predetermined number of main data in accordance with a control signal received by said switching means from said control means.

* * * * *

UNITED STATES PATENT AND TRADEMARK OFFICE
CERTIFICATE OF CORRECTION

PATENT NO. : 5,130,863
DATED : July 14, 1992
INVENTOR(S) : Shinichi Yamashita, et al.

It is certified that error appears in the above-identified patent and that said Letters Patent is hereby corrected as shown below:

ON THE COVER PAGE

UNDER U.S. PATENT DOCUMENTS

"4,392,162 6/1983" should read --4,392,162 7/1983--.

COLUMN 2

Line 35, "limit." should read --unit.--.

COLUMN 6

Line 34, "explantion" should read --explanation--.

COLUMN 7

Line 54, "serilization" should read --serialization--.

COLUMN 8

Line 58, "RAM 7" should read --RAM 27--.

UNITED STATES PATENT AND TRADEMARK OFFICE
CERTIFICATE OF CORRECTION

PATENT NO. : 5,130,863
DATED : July 14, 1992
INVENTOR(S) : Shinichi Yamashita, et al.

It is certified that error appears in the above-identified patent and that said Letters Patent is hereby corrected as shown below:

COLUMN 9

Line 31, "controller 3," should read --controller 103,--; and
　　　Line 36, "a" should read --the--.

COLUMN 10

Line 17, "divider 8." should read --divider 108.--; and
　　　Line 24, "cylinder 10" should read --cylinder 110--.

COLUMN 11

Line 43, "circuits." should read --circuits--.

COLUMN 16

Line 9, "to" should read --to a--.

Signed and Sealed this

Twentieth Day of September, 1994

Attest:

BRUCE LEHMAN

*Attesting Officer*　　　*Commissioner of Patents and Trademarks*